United States Patent [19]

Schou

[11] Patent Number: 4,640,143

[45] Date of Patent: * Feb. 3, 1987

[54] SELF-LOCKING DIFFERENTIAL WITH HEXAGONAL DRIVE ROD

[76] Inventor: Carl E. Schou, 1438 Lone Pine Rd., Bloomfield Hills, Mich. 48013

[*] Notice: The portion of the term of this patent subsequent to Feb. 12, 2002 has been disclaimed.

[21] Appl. No.: 698,996

[22] Filed: Feb. 7, 1985

Related U.S. Application Data

[63] Continuation-in-part of Ser. No. 371,034, Apr. 22, 1982, Pat. No. 4,498,355.

[51] Int. Cl.⁴ ............................................. F16H 35/04
[52] U.S. Cl. .......................................... 74/650; 74/711
[58] Field of Search .................................. 74/650, 711

[56] References Cited

U.S. PATENT DOCUMENTS

| | | | |
|---|---|---|---|
| 1,275,952 | 8/1918 | Luxmore | 74/650 |
| 1,477,311 | 12/1923 | Cartwright | 74/650 |
| 1,704,861 | 3/1929 | Lewis | 74/650 |
| 2,060,558 | 11/1936 | DeLavaud | 74/650 |
| 2,179,923 | 11/1939 | DeLavaud | 74/650 |
| 2,397,673 | 4/1946 | Lewis | 74/650 X |
| 2,555,044 | 5/1951 | Lewis | 74/650 |
| 2,720,796 | 10/1955 | Schou | 74/711 |
| 4,400,996 | 8/1983 | Schou | 74/650 |
| 4,498,355 | 2/1985 | Schou | 74/650 |

Primary Examiner—Leslie Braun
Assistant Examiner—D. Wright
Attorney, Agent, or Firm—Cullen, Sloman, Cantor, Grauer, Scott and Rutherford

[57] ABSTRACT

A locking means fitted within a conventional automotive vehicle type differential housing assembly normally couples the wheel axles to the power rotated housing so that the axles are driven by and rotate with the housing. When either axle rotates faster than the other axle and the housing, the locking means momentarily uncouples the faster rotating axle so that it freewheels, while the other axle continues to be driven. The locking means includes a pair of axially aligned, closely spaced apart coupling rings, each of which surrounds a bushing-like hub mounted upon an axle end portion located within the housing. A diametrically arranged, drive rod of hexagonal cross-section is positioned between the rings and extends through opposite pairs of aligned V-shaped notches formed in the facing ends of the rings. The outer ends of rod are fastened to the housing for rotating therewith. The walls of the notches are parallel to, but slightly spaced from, their adjacent rod faces. Thus, when the rod rotates with the housing, it engages the notch forming walls in its rotational path to rotate the coupling rings and simultaneously wedge them outwardly apart. The coupling rings are connected to the hubs by clutches that engage when the rod moves the rings apart and disengage when the rings move inwardly towards each other. When one axle rotates faster than the housing, its coupling ring advances angularly relative to the rod to disengage its notch forming walls from the rod, which results in its ring moving inwardly towards the other ring to disengage its clutch for freewheeling until its speed returns to housing speed. A limit means keeps the rod centered within the notches when the coupling ring is angularly advanced.

3 Claims, 8 Drawing Figures

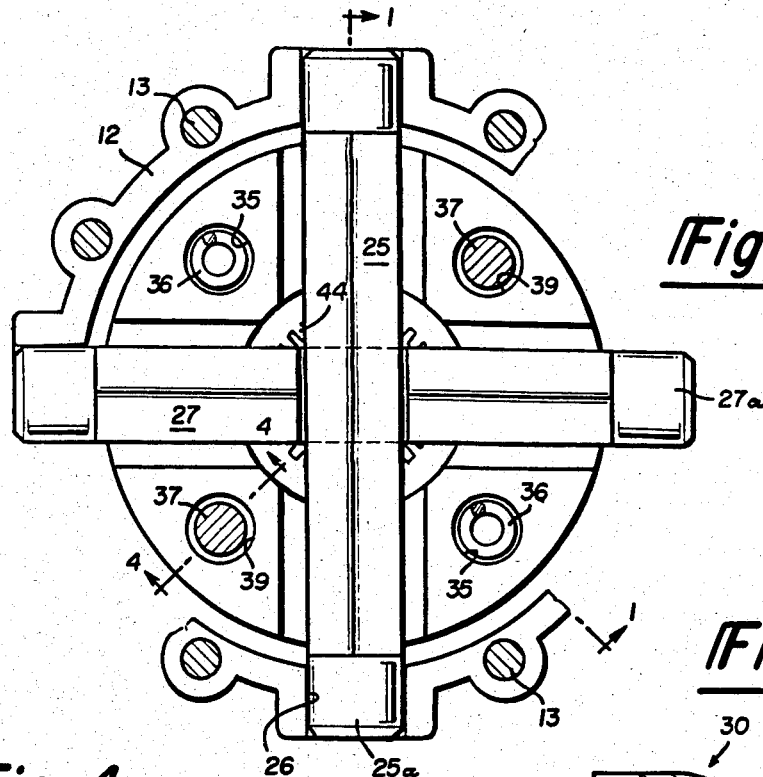
Fig-3
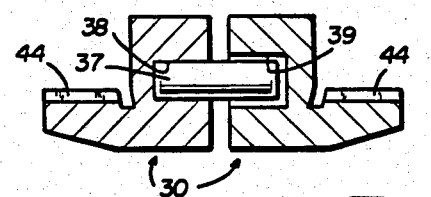
Fig-4
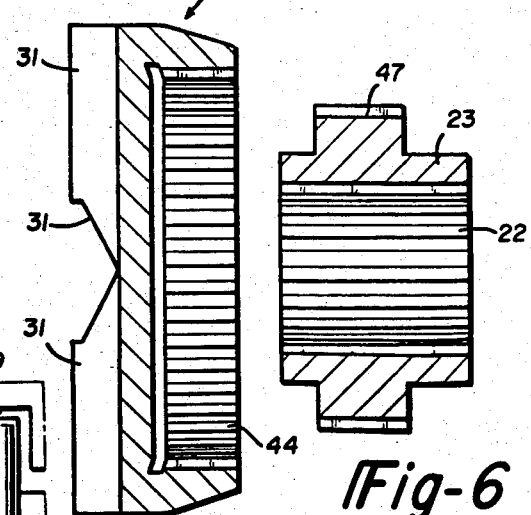
Fig-5
Fig-6
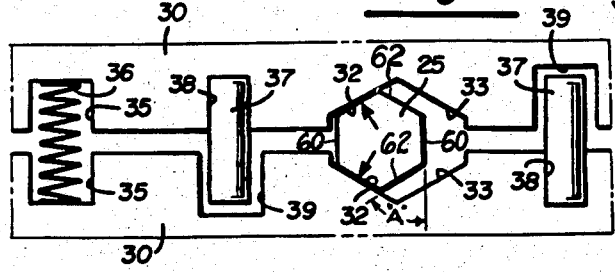
Fig-7
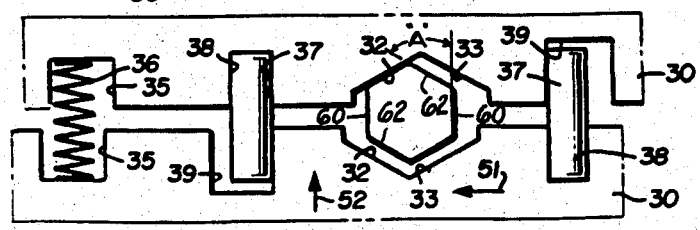
Fig-8

SELF-LOCKING DIFFERENTIAL WITH HEXAGONAL DRIVE ROD

This application is a continuation in part of my co-pending patent application, U.S. Ser. No. 371,034 filed Apr. 22, 1982, now U.S. Pat. No. 4,498,355.

BACKGROUND OF INVENTION

Commonly used automotive vehicle differentials generally comprise a housing which is gear connected to the vehicle engine drive shaft for rotating the housing. Bevel gear arrangements within the housing transmit the torque equally to both of the driven wheel axles. These axles have inner ends that extend into the housing and outer ends connected to the wheels. The differential gearing permits the speeds of the driven shafts to change according to demand. However, in these conventional differential assemblies, when the traction of either wheel is zero, such as when the wheel is spinning on ice or snow or mud, there is no power or torque transmitted to the opposite wheel so that it remains stationary.

Various types of limited slip differentials have been developed in the past for the purpose of powering one wheel during the time that the other wheel spins, that is, has lost its traction. An example of one form of such a power dividing or limited slip differential is disclosed in my prior U.S. Pat. No. 2,720,796 issued Jan. 18, 1955.

Another type of differential includes a locking means which normally locks both axles to the power rotating housing for equal rotational speed of the driven wheel axles, but wherein, when one of the axles rotates faster than the other, such as the one located on the outside curve during turning of a vehicle, that axle is momentarily disengaged and permitted to free wheel while the other axle receives the torque. Examples of this kind of locking differential are described in U.S. Pat. No. 1,275,952 to Luxmoor issued Aug. 13, 1918, and U.S. Pat. No. 1,477,311 to Cartwright issued Dec. 11, 1923, U.S. Pat. No. 2,060,558 to De Lavaud issued Nov. 10, 1936 and U.S. Pat. No. 2,179,923 to De Lavaud issued May 27, 1937. Another example of that general type of locking differential is disclosed in my patent application, U.S. Ser. No. 306,833 filed Sept. 29, 1981, now U.S. Pat. No. 4,400,996.

These locking differentials, in general, comprise an assembly of a central driving member which is connected to, and rotates with, the rotating housing and which is releasably coupled to driven pressure plates located on opposite sides of the driving member. The pressure plates, in turn, are coupled to the axle ends through clutches or couplings.

During normal operation, such as on a straight path of movement of the vehicle, the rotating driving member drives both of the pressure plates through their couplings. Likewise the pressure plates drive both of the axles equally through their couplings. However, when one axle overruns the other, such as during the time that one wheel rotates faster than the other while the vehicle travels around a curve, the over-running axle causes its pressure plate to uncouple from the driving member so that the axle can freewheel, until it returns to the speed of the other axle.

The invention herein relates to this latter kind of locking differential, that is, a differential wherein either axle is uncoupled from the power source during the times that it rotates faster than the other axle and the housing. However, the assembly of this invention is simplified and very compact so that it may be utilized with existing vehicle differential housings. That is, it may be substituted for the mechanism which otherwise would have been used within that conventional housing. Thus, in the case of certain vehicles, such as trucks, conventional differentials can be converted into self-locking differentials by replacing the assembly within the existing housing with the assembly of this invention, without otherwise having to modify the housing or the other drive train parts.

SUMMARY OF INVENTION

The invention herein relates to a locking means for fitting within a conventional engine powered differential housing for the purpose of uncoupling either of the two wheel axles from the power source during the time that the axle rotates at a speed in excess of the housing rotation. The locking means is made in a compact, simplified manner, so that it may replace the differential assembly which otherwise had been used with that conventional housing.

The locking means includes at least one hexagonal cross-section drive rod or bar diametrically arranged within, and whose ends are connected to the housing for rotation therewith. A pair of identical coupling rings are arranged on opposite sides of the rod. Each of the rings has V-shaped open notches formed in its exposed face so that the rod radially extends through a pair of aligned notches. The rod is relatively loose within the notches, so that when the rod rotates with the housing, its lead edges or surfaces engage the notch walls in their path of rotation for rotating the coupling rings.

Due to the angles or slopes of the notch walls, their contact by the rod simultaneously wedges the coupling rings endwise, that is, outwardly of each other relative to the axis of rotation of the housing. The coupling rings each surround and receive a bushing-like hub. A plate or disk-type clutch is arranged between the outer surface of the hub and the interior surface of the coupling ring. The hubs each receive and are spline connected to an inner end of the axle which extends into the housing.

The clutches are engaged or actuated when the coupling rings are forced apart, outwardly of each other, by the engagement of the driving rods. That is, the axially outward pressure of the coupling rings cause the clutches to engage for thereby coupling the axles, through the clutches and coupling rings to the driving rods and, consequently, to the housing for rotating together.

However, when either one of the axles rotate faster than the housing and the other axle, such as during a turn, its coupling ring advances angularly faster than the rod engaged within its notches. Hence, the rod temporarily disengages or gaps away from that ring's notch walls. During that period of disengagement, the coupling ring tends to move inwardly, towards the other coupling ring. This releases the pressure on the clutch, thus, disengaging the faster moving axle and permitting it to freewheel. That condition continues until the freewheeling axle slows down to the speed of the other axle. At that point the rod re-engages the notch walls to again rotatably drive the ring and simultaneously thrust it outwardly for recoupling to the axle.

A simple pin and socket, mechanical limit connection between the two coupling rings permit them to angularly move relative to each other to the point where the rod is approximately centered within the notches of the coupling ring that has angularly advanced due to the excessive speed of its axle. This prevents the engagement of the spokes with the trailing faces of the notches.

An object of this invention is to provide a positive type locking differential whose size and cost will not materially exceed that of a standard differential and which may be substituted for an existing differential without affecting related vehicle parts, such as the drive train and differential housing.

Another object of this invention is to provide a differential whose torque distribution to the wheels is proportional to the sum of the wheels tractive effort. Moreover, the differential effects a virtually instantaneous transfer of all power to the wheel with the slower rotation.

Among the objects of this invention is to provide a locking differential which will increase vehicle stability at high speed and reduce "fishtailing" on slippery road surfaces. This differential provides for more precise steering and improved road handling which, of course, improves vehicle safety.

In addition, because the locking means operates virtually instantaneously for engaging and disengaging the excessively rotating axle, wear of the coupling or clutch parts is substantially reduced to zero. Moreover, the rapid engagement and disengagement is noise free, in contrast to presently available locking type differentials.

These and other objects and advantages of this invention will become apparent upon reading the following description, of which the attached drawings form a part.

DESCRIPTION OF DRAWINGS

FIG. 3 is a fragmentary cross-sectional view taken in the direction of arrows 3—3 of FIG. 1, showing the assembled relationship of the driving rods and one of the coupling plates.

FIG. 4 is a schematic, fragmentary view, taken in the direction of arrows 4—4 of FIG. 3, of the angular movement limit means, which limits relative angular movement between the two coupling rings.

FIGS. 5 and 6 are cross-sectional views, drawn to a smaller scale, of the coupling ring and an axle hub, respectively, which connect together through a plate-type clutch.

FIG. 7 is a schematic, fragmentary view of the normal drive condition wherein the drive rod contacts the walls of the opposed notches for driving both coupling plates.

FIG. 8 is a schematic, fragmentary view, similar to FIG. 7, but showing one of the two coupling rings angularly advanced relative to the drive rod during the time that its respective axle is rotating at a speed greater than the rotational speed of the other axle and housing.

DETAILED DESCRIPTION

Figure 1:
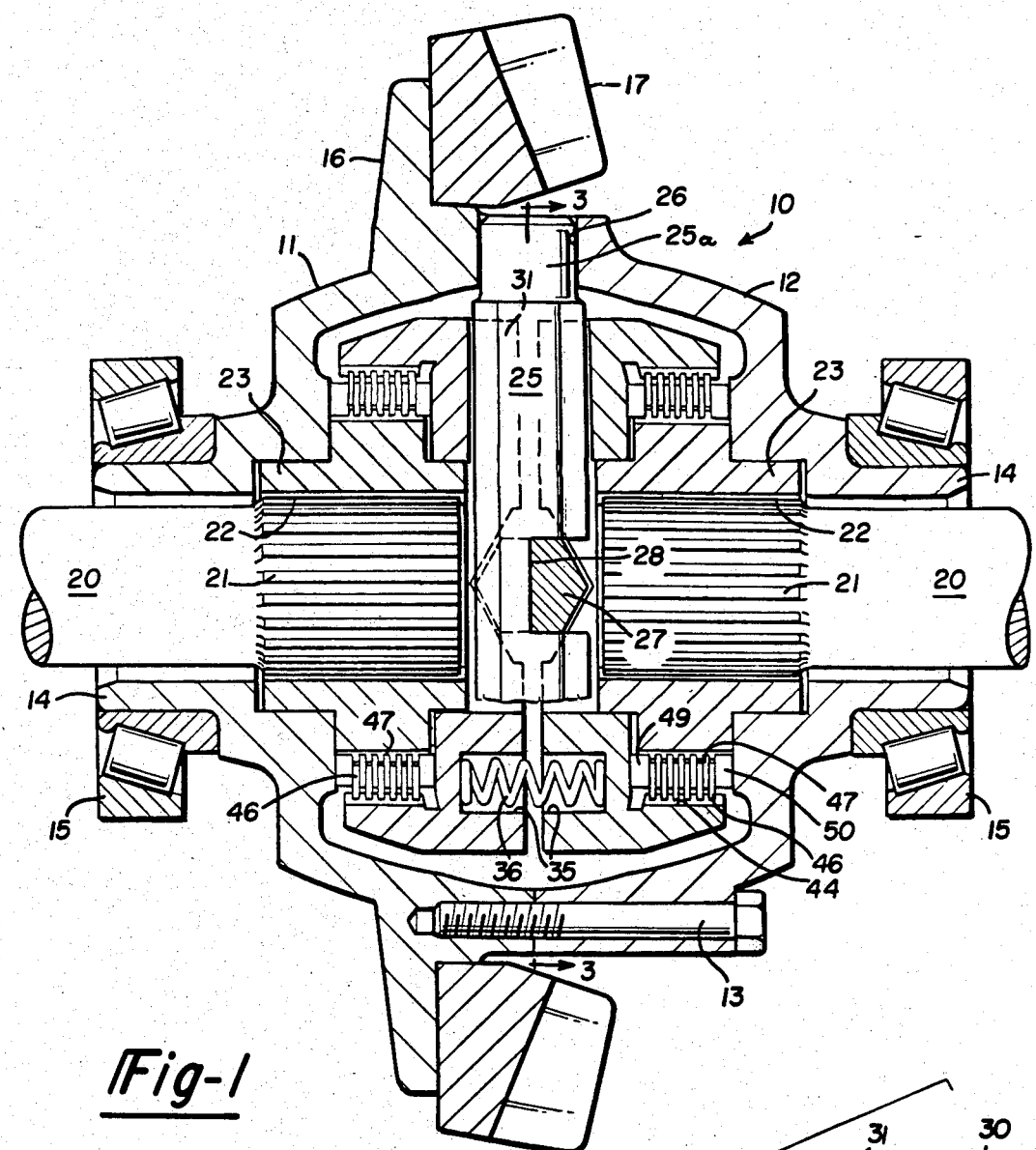
FIG. 1 is a cross-sectional view schematically illustrating the locking means and differential assembly.
Figure 2:
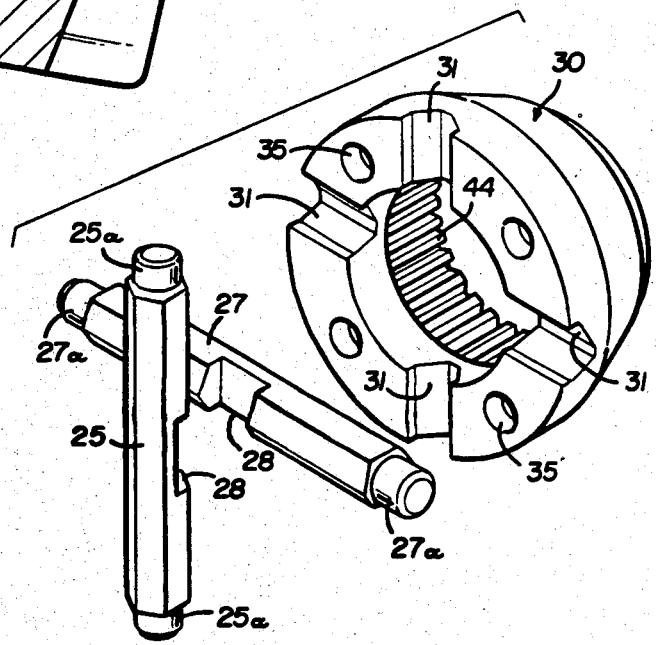
FIG. 2 is a perspective view, to a smaller scale, of one of the coupling rings of the locking means assembly, with two drive bars or rods illustrated in alignment with the ring.

FIG. 1 schematically illustrates the differential locking means assembly. The differential includes a conventional housing or casing 10, typically made of two parts 11 and 12 secured together by suitable bolts 13 (see FIG. 3). The housing parts include opposed bearing ends 14 upon which conventional roller bearings 15 are mounted. These bearings are secured within the differential non-rotatable fixed outer structure or outer housing within which the housing or casing 10 rotates about the bearings. Since the stationary outer housing and rotatable inner housing assembly is conventional, the stationary housing is omitted for illustrative purposes. By way of example, such a construction is shown in my U.S. Pat. No. 2,720,796 issued Oct. 18, 1955 for a Power-Dividing Differential.

One of the rotatable housing parts includes a flange 16 upon which is mounted the conventional bevel gear 17 which is meshed with the conventional drive pinion of an engine drive shaft for powering the housing.

The inner ends of axles or shafts 20 extend into the rotatable housing 10. Splines 21 are formed on the axle inner ends for meshing with internal splines 22 formed in axle hubs or collars 23 that are slidably mounted upon the axle splines.

A drive rod 25 is diametrically arranged within the housing. The drive rod is formed of a hexagonal cross-section bar 25 whose outer ends 25a may be cut into a round cross-section to fit into round openings 26 broached or machined in the housing to fix the rod relative to the housing so that the two rotate together as one unit. Alternatively the bar may be of uniform cross-section from end to end, with its ends fitted into correspondingly shaped openings broached in the housing. A second drive rod 27 is formed similar to rod 25 and has its ends 27a fixed within similar housing openings. The two rods are provided with notches 28 at their centers where they overlap so that they interlock and also are within the same general plane. For some applications, e.g. low load applications, the second rod may be omitted and only one rod used.

A pair of identical coupling rings 30 are arranged on opposite sides of the spider spokes and surround the axle collars 23. V-shaped notches 31 are formed in the inner annular face of each of the coupling rings. These notches are aligned so as to form pairs of notches between which the drive rods are loosely received. The walls defining the notches are parallel to but slightly spaced from their adjacent drive rod surfaces. These notches define oppositely sloping walls 32 and 33 (see FIG. 7) which engage the drive rods as will be explained below.

Holes or sockets 35 are formed in the annular inner face of each of the coupling rings to receive coil springs 36 which springs urge the two coupling rings apart.

In addition, the coupling rings are further connected together by a number of limit pins 37. One end of each of the pins is tightly fitted within a socket 38 formed on one of the coupling rings. The opposite end of each of the limit pins loosely fits into an enlarged socket 39 formed in the opposite coupling ring (see FIG. 7).

Splines 44 are formed within the inner surface of each of the coupling rings. Disk-type clutches 46 are arranged within the coupling rings, surrounding the axle collars. Each of the axle collars are provided with external splines 47.

The disk-type, self locking clutches each comprise a number of flat plate-like disks which have alternating tabs, that is, outer tabs and inner tabs on alternate plates. These tabs interfit within either the coupling ring internal splines 44 or the collar external splines 47. Thus, every other clutch plate is axially slidably, but non-rotatably, secured to the coupling ring. The in-between plates are correspondingly axially slidably, but non-rotatably secured to the axle collar. Compressing the plates together causes them to frictionally lock together to thereby couple the coupling ring to the axle hub or collar.

Each of the clutches include an axial slidable inner stop ring 49 and an outer anvil ring 50. Thus, outwardly directed pressure by the coupling ring against the clutch inner stop ring 49 compresses the plates or disks against the clutch outer anvil ring for locking the clutch. Conversely, release of that pressure permits the disks to slide relative to each other for releasing the clutch.

OPERATION

FIG. 1 illustrates a differential-locking assembly at rest. When the engine powered pinion (not shown) rotates against the housing bevel gear 17, the housing rotates around its bearings 15 within the fixed outer housing or structure. This causes the drive rods to rotate as if they are part of the housing because of the interconnection between the rod ends and the housing.

Rotation of the drive rods results in their engaging against the sloped walls 32, of the notches 31. That is, their faces or surfaces engage the notch walls which are in its path of rotation. FIG. 7 illustrates, by arrows, the pressure of the sloped walls of the rod 25 against the correspondingly sloped walls 32 of the notches 31 in each of the two coupling rings 30. The equal pressure, as symbolized by the arrows, causes both of the coupling rings to rotate at the same speed as the rod. Simultaneously, the coupling rings are wedged outwardly or apart from each other so that they apply pressure to their respective clutch inner stop rings 49. This compacts the alternating clutch disks, thereby locking each of the clutches. Because the clutches are locked, due to the outwardly directed pressure of their respective coupling rings, the axle hubs or collars rotate with the coupling rings. This, of course, rotates the axles of rotate the drive wheels of a vehicle. As long as the two axles are rotating at the same speed, such as when the vehicle is on a straight path, the condition shown in FIG. 7 is maintained.

Each drive rod 25 includes opposed lead faces 60 which are substantially perpendicular to the plane of rotation of the drive rod. Each of the sloped walls 62 of the drive rod 25 form a pressure angle "A" with a respective lead face 60. This angle is defined as follows:

$$\text{Tan } A \geq \frac{r}{R \times N \times U}$$

A = pressure angle
r = outer radius of coupling ring 30
R = mean radius of disk clutch 46
N = number of friction surfaces on driving disks in clutch 46
U = coefficient of friction for friction surfaces Rotation of a drive rod 25 results in the drive rod sloped walls 62 engaging either notch walls 32 or 33 depending upon whether the drive rod is rotating clockwise or counter-clockwise. The pressure angle "A" determines the required thrust upon the disk type clutches 46 to make the clutch self locking. Thus, the particular arrangement of drive rod 25 within V-shaped notches 31 provides the required force to lock the differential.

In the event that either of the two wheel axles speeds up relative to the other wheel axle and the housing, that over-running axle is momentarily disengaged from and is permitted to freewheel relative to the differential. This is accomplished by the faster moving axle causing its coupling ring to angularly advance relative to the spokes, as schematically illustrated in FIG. 8. The faster moving ring is designated by an arrow 51 in FIG. 8. Meanwhile, the other coupling ring, remains in contact with the drive rod and is driven as before.

The angularly advanced clutch ring moves a sufficient number of degrees to roughly center the rods within the notches formed in that ring, as shown in FIG. 8. This relieves the pressure of the rods against the sloped walls of the ring notches and the ring immediately moves inwardly towards the rod, as indicated by the symbolic arrow 52 in FIG. 8. Now that the angularly advanced coupling ring is disengaged from the rods and moves inwardly toward the other ring, the pressure of that ring against its clutch is relieved so that the clutch immediately disengages and the axle collar with the axle are free to rotate or free-wheel without receiving any power from the differential. However, the other axle receives the power.

In order to prevent the rods from contacting the trailing walls 33 of the notches when the coupling ring angularly advances as shown in FIG. 8, a limiting means is provided. The limiting means restricts the amount of angular advance of the coupling ring. The limiting means is in the form of the pins 37 which are loosely socketed within one of the coupling rings. The amount of looseness or backlash corresponds to the angular distance required to permit the rods to approximately center within the angularly advanced notches so as to prevent rod contact with the trailing surfaces of the notches.

FIG. 7 illustrates the normal position of each of the limiting pins during the normal driving of both coupling rings by the drive rods. Pins 37 are tightly fixed within sockets 38 of one of the coupling rings and are approximately centered within its loosely fitted socket 39 in the other coupling ring. However, when one of the coupling rings angularly advances, the pins also move angularly to contact against the wall of the loose socket, as shown in FIG. 8. The amount of pin movement is sufficient to approximately center the rods within their respective advanced notches and to relieve the coupling ring pressure on the clutches.

The hexagonal cross-sectional shape of the rods provide good face to face contact with the matching notch walls to broadly distribute loads. Despite such wide area contacts, the engagement and disengagements are virtually instantaneous. Also, since the notches are V-shaped in cross-section, the same coupling and uncoupling operation can take place regardless of the direction of rotation of the differential. That is, it can be operated forwardly or reversely and the same effect of the coupling rings is achieved.

Having fully described an operative embodiment of this invention, I now claim:

1. A differential assembly, self-releasing locking means for connecting and disconnecting the end portions of each of a pair of axially aligned, conventional axle-like shafts to a conventional power rotated housing which contains said end portions, comprising:

a diametrically arranged, hexagonal cross-section, drive rod housed between the adjacent shaft end portions and having its outer ends fixedly connected to the housing for rotating therewith;

a pair of closely spaced apart, opposing coupling rings in axial alignment with and surrounding bushing-like hubs mounted upon the shaft end portions;

pairs of aligned, adjacent V-shaped notches formed in the facing ends of the coupling rings with the drive rod radially extending through the V-shaped notches, and with the V-shaped notch forming walls being parallel to and slightly spaced from their adjacent rod faces;

said drive rod being positioned between said coupling rings and having opposed lead faces which are perpendicular to the plane of rotation of said drive rod;

a clutch means releasably interconnecting each of the coupling rings to the bushing-like hub which said ring surrounds, said clutch means being engaged by axially outwardly directed pressure caused by movement of the coupling ring away from the opposite coupling ring, and said clutch means being disengaged upon release of the ring pressure due to movement of the ring inwardly towards the opposite coupling ring, and each of said clutch means including a series of interleaved ring-like clutch plates surrounding a shaft end hub, and being surrounded by a coupling ring, and with alternate plates being spline connected to the coupling ring and to the hub, with the interleaved clutch plates being relatively axially movable together into engaging surface to surface contact for locking and being movable apart from each other for unlocking in response to corresponding movement of their coupling ring;

said drive rod including a pair of opposed side walls associated with each lead face, each drive rod side wall forming a pressure angle "A" with respect to its associated lead face with angle "A" being defined as follows:

$$\operatorname{Tan} A \geqq \frac{r}{R \times N \times U}$$

A = pressure angle
r = outer radius of coupling rings
R = mean radius of clutch means
N = number of friction surfaces on clutch plates
U = coefficient of friction for friction surfaces whereby during normal powered rotation of the housing, the drive rod rotates with the housing and engages the V-shaped notch forming walls that are in its path of rotation for rotating the coupling rings and simultaneously, for wedging the V-shaped notch forming walls apart, causing the coupling rings to move axially apart and to apply axially outwardly directed pressure upon the clutch means to thereby lock the hubs and shaft end portions to the housing for rotation therewith; but when either of the shafts rotate faster than the rotation of the housing, the coupling ring of that shaft angularly moves forwardly relative to the drive rod so as to disengage the rod from the notch forming walls for that coupling ring resulting in that coupling ring moving inwardly towards the opposite coupling ring and releasing its pressure upon, and consequently unlocking, its clutch means so that its shaft may free wheel relative to the housing;

and stop means connecting the coupling rings for limited relative angular movement of one coupling ring relative to the other so that during the times that the drive rod is disengaged from the notch forming walls in the path of its direction of rotation, the rod is roughly centered within the walls forming such notches, and said stop means being formed of a number of pins, each having one end secured to one of the coupling rings, and its opposite end extending towards and loosely fitting into a socket formed in the other coupling ring, with the degree of looseness corresponding to the permissible angular movement of one ring relative to the other for centering the drive rod within the notches of one ring, and coil springs means arranged between and normally spring pressing the two coupling rings apart in the axial direction for normally tending to move the rings axially away from the rod and into position for applying pressure to their respective clutch means for engaging the clutch means.

2. A locking means for positioning within the housing of a conventional differential housing axial-like shaft assembly, wherein the end portions of a pair of axially aligned shafts are received within and rotate with a power rotated housing, comprising:

a pair of closely spaced apart, axially aligned, coupling rings, each formed to surround the end portion of one shaft, and with V-shaped notches formed in the adjacent, that is, inner ends of the rings, and with the V-shaped notches in one ring aligned with the V-shaped notches in the other ring to form opposed pairs of notches;

a hexagonal cross-section drive rod arranged between the adjacent ends of and extending radially of the rings, and being received within opposed pairs of V-shaped notches formed in the opposed ring faces;

and with the outer ends of the rod being formed for positive securement into corresponding openings in the housing for rotation of the drive rod with the housing, and said hexagonal drive rod being positioned between said coupling rings and having opposed lead faces which are perpendicular to the plane of rotation of said drive rod;

said V-shaped notches being slightly larger in width than the rod width so that the rod can be moved into either contacting the V-shaped notch defining walls in its path when the rod rotates with the housing, or the rod can be roughly centered within the V-shaped notches, that is out of contact with the V-shaped notch defining walls;

releasable clutch means for interconnecting the coupling rings to their respective shaft end portions when the rings move axially outwardly, that is, in a direction away from the other ring, and for disengaging a ring when that ring moves axially towards the other;

whereby rotation of the drive rod, due to housing rotation, causes the rod to contact the V-shaped notch defining walls in their direction of rotation for rotating the coupling rings and simultaneously wedging the rings apart due to the slope of said walls, so that the coupling rings are connected to the shaft end portions by their clutch means, but wherein rotation of each shaft at a speed in excess of the housing and rod rotational speed causes that shaft's coupling ring to over-run the rod, that is, angularly move faster than the rod, to thereby gap the V-shaped notch wall of that coupling ring from the rod, and permit the coupling ring to move inwardly, that is, towards the other ring for temporarily disengaging its clutch means and permitting its shaft to free wheel;

and limit means connecting the coupling rings for limited relative angular movement to the point where the rod is roughly centered, that is, out of contact, relative to the walls defining the V-shaped notch in the coupling ring which angularly moves relative to the drive rod due to the excessive speed of its shaft.

3. A locking means as defined in claim 2, and said limit means being formed of pins, each having one end secured to one of the coupling rings and extending in a generally axial direction to the opposite coupling ring and loosely fitted into a socket formed in the opposite coupling ring, with the degree of looseness of the pins relative to the sockets corresponding to the permissible angular movement of one ring relative to the other;

and a number of springs arranged between adjacent end portions of the coupling rings for normally biasing the rings apart into their clutch engaging direction.

* * * * *